(12) United States Patent
Nakao (10) Patent No.: US 9,942,422 B2
(45) Date of Patent: Apr. 10, 2018

(54) ELECTRONIC APPARATUS AND IMAGE FORMING APPARATUS

(71) Applicant: KYOCERA Document Solutions Inc., Osaka (JP)

(72) Inventor: Masahiro Nakao, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 426 days.

(21) Appl. No.: 14/166,433

(22) Filed: Jan. 28, 2014

(65) Prior Publication Data
US 2014/0215374 A1 Jul. 31, 2014

(30) Foreign Application Priority Data
Jan. 29, 2013 (JP) ................. 2013-014767

(51) Int. Cl.
*G06F 3/12* (2006.01)
*H04N 1/00* (2006.01)

(52) U.S. Cl.
CPC ..... *H04N 1/00395* (2013.01); *H04N 1/00411* (2013.01); *H04N 1/00517* (2013.01);
(Continued)

(58) Field of Classification Search
CPC .............. G06F 3/0481; G06F 3/04817; G06F 3/04812; G06F 21/36; G06F 3/0485;
(Continued)

(56) References Cited

U.S. PATENT DOCUMENTS 5,177,625 A   1/1993 Nakashima et al.
5,384,632 A * 1/1995 Nakajima ............. G03G 15/50
                                                      399/45
(Continued)

FOREIGN PATENT DOCUMENTS

JP   H03-248672 A   11/1991
JP   H05-075752 A    3/1993
(Continued)

OTHER PUBLICATIONS

Notice of Rejection mailed by Japan Patent Office dated Mar. 3, 2015 in the corresponding Japanese patent application No. 2013-014767—3 pages.

*Primary Examiner* — Abdullah Al Kawsar
*Assistant Examiner* — Carl Lobo
(74) *Attorney, Agent, or Firm* — IP Business Solutions, LLC (57) ABSTRACT

An image forming apparatus includes: a display; a setting change determining section configured to, after the receipt of a command to execute a function, determine whether or not any of setting items for the function has been changed; a change frequency value storage section configured to store a change frequency value indicating a frequency of change of the individual setting item; a shortcut screen creating section configured to create one or more shortcut keys each for receiving a command to change one of the setting items in different sizes depending upon the change frequency value stored in the change frequency value storage section and create a shortcut screen on which the shortcut keys are arranged; and a display control section configured to read the shortcut screen created by the shortcut screen creating section and allow the display to display the shortcut screen.

8 Claims, 8 Drawing Sheets (52) U.S. Cl.
CPC ......... *G06F 3/1205* (2013.01); *G06F 3/1253* (2013.01); *G06F 3/1279* (2013.01)

(58) Field of Classification Search
CPC .... G06F 3/0488; G06F 3/1253; G06F 3/1273; G06F 3/0482; G06F 3/1204; G06F 1/3284; G06F 1/3287; G06F 3/017; H04N 2201/0094; H04N 1/00411; H04N 1/00413; H04N 1/00482; H04N 1/00503; H04N 1/00204; H04N 1/00408; H04N 1/00424; G06T 1/0078
See application file for complete search history.

(56) References Cited

U.S. PATENT DOCUMENTS

| | | | | |
|---|---|---|---|---|
| 6,567,627 B2* | 5/2003 | Maeda | | H04N 1/00352 399/81 |
| 6,978,095 B2* | 12/2005 | Kato | | G03G 15/5075 358/1.15 |
| 8,490,018 B2* | 7/2013 | Carter | | G06Q 10/1093 706/12 |
| 8,595,647 B2* | 11/2013 | Sabin | | G06F 3/0481 715/810 |
| 8,730,494 B2* | 5/2014 | Ishiguro | | G03G 15/502 358/1.13 |
| 9,032,328 B1* | 5/2015 | Kilat | | G06F 8/315 715/744 |
| 9,378,281 B2* | 6/2016 | Melton | | G06F 17/30864 |
| 9,448,691 B2* | 9/2016 | Suda | | G06F 3/0488 |
| 9,542,061 B2* | 1/2017 | Baalu | | G06F 3/0481 |
| 2002/0015598 A1* | 2/2002 | Maeda | | H04N 1/00352 399/81 |
| 2002/0136563 A1* | 9/2002 | Maeda | | H04N 1/00352 399/81 |
| 2004/0057751 A1* | 3/2004 | Matsuo | | G03G 15/0121 399/227 |
| 2004/0142720 A1* | 7/2004 | Smethers | | G06F 3/0482 455/550.1 |
| 2005/0047812 A1* | 3/2005 | Takemura | | G03G 15/5075 399/75 |
| 2005/0243364 A1* | 11/2005 | Sakai | | G06F 21/608 358/1.15 |
| 2006/0028690 A1* | 2/2006 | Kunori | | H04N 1/00408 358/401 |
| 2006/0050307 A1* | 3/2006 | Koike | | H04N 1/00002 358/1.15 |
| 2006/0095864 A1* | 5/2006 | Mock | | G06F 1/3203 715/810 |
| 2006/0187483 A1* | 8/2006 | Baba | | H04N 1/00389 358/1.15 |
| 2007/0247641 A1* | 10/2007 | Okuma | | G06F 3/04817 358/1.1 |
| 2007/0283293 A1* | 12/2007 | Nakamura | | G06F 3/1211 715/811 |
| 2008/0022228 A1* | 1/2008 | Kwon | | G06F 3/04817 715/838 |
| 2008/0244402 A1* | 10/2008 | Sakakibara | | H04N 1/00408 715/708 |
| 2008/0313567 A1* | 12/2008 | Sabin | | G06F 3/0481 715/835 |
| 2009/0009806 A1* | 1/2009 | Matsuda | | H04N 1/00384 358/1.15 |
| 2009/0015569 A1* | 1/2009 | Machida | | G06Q 30/02 345/204 |
| 2009/0046057 A1* | 2/2009 | Umezawa | | G06F 3/04886 345/156 |
| 2009/0125841 A1 | 5/2009 | Yamashita | | |
| 2009/0316205 A1* | 12/2009 | Nakada | | H04N 1/00355 358/1.15 |
| 2009/0319889 A1* | 12/2009 | Nakada | | H04N 1/00411 715/273 |
| 2010/0011318 A1* | 1/2010 | Nakada | | G03G 15/5016 715/808 |
| 2010/0017731 A1* | 1/2010 | Taira | | G06F 3/0481 715/765 |
| 2010/0050128 A1* | 2/2010 | Chiang | | G06F 3/0482 715/847 |
| 2010/0064068 A1* | 3/2010 | Miyazawa | | G03G 15/502 710/19 |
| 2010/0071069 A1* | 3/2010 | Sugiura | | G06F 21/608 726/26 |
| 2010/0079794 A1* | 4/2010 | Kim | | G06F 3/023 358/1.15 |
| 2010/0122187 A1* | 5/2010 | Kunori | | G06F 3/04845 715/762 |
| 2010/0134312 A1* | 6/2010 | Park | | G06F 1/1626 340/689 |
| 2010/0134817 A1* | 6/2010 | Torii | | H04N 1/00413 358/1.13 |
| 2010/0217762 A1* | 8/2010 | Kajio | | H04N 5/44543 707/723 |
| 2011/0030050 A1* | 2/2011 | Fukushima | | G06F 3/1204 726/16 |
| 2011/0115704 A1* | 5/2011 | Kato | | G06F 3/0202 345/157 |
| 2011/0128564 A1* | 6/2011 | Kayama | | H04N 1/00204 358/1.13 |
| 2011/0128575 A1* | 6/2011 | Iwata | | H04N 1/00416 358/1.15 |
| 2011/0228321 A1* | 9/2011 | Shigenobu | | H04N 1/00384 358/1.15 |
| 2011/0242561 A1* | 10/2011 | Nitta | | G06F 3/04886 358/1.9 |
| 2012/0023451 A1* | 1/2012 | Kuroyanagi | | G06F 8/38 715/835 |
| 2012/0030605 A1* | 2/2012 | Nakanishi | | H04N 1/00411 715/773 |
| 2012/0044517 A1* | 2/2012 | Fukasawa | | G06F 3/1204 358/1.13 |
| 2012/0155896 A1* | 6/2012 | Shibuya | | G03G 15/0275 399/44 |
| 2012/0250060 A1* | 10/2012 | Shigenobu | | H04N 1/00387 358/1.13 |
| 2012/0274965 A1* | 11/2012 | Yoshida | | H04N 1/00384 358/1.13 |
| 2012/0299814 A1* | 11/2012 | Kwon | | H04M 1/72583 345/156 |

FOREIGN PATENT DOCUMENTS

| | | |
|---|---|---|
| JP | H09-269882 A | 10/1997 |
| JP | 2004-348085 A | 12/2004 |
| JP | 2005-032239 A | 2/2005 |
| JP | 2006-025267 A | 1/2006 |
| JP | 2008-304509 A | 12/2008 |
| JP | 2009-122862 A | 6/2009 |

* cited by examiner

ELECTRONIC APPARATUS AND IMAGE FORMING APPARATUS

INCORPORATION BY REFERENCE

This application claims priority to Japanese Patent Application No. 2013-014767 filed on Jan. 29, 2013, the entire contents of which are incorporated by reference herein.

BACKGROUND

The present disclosure relates to electronic apparatuses and image forming apparatuses and particularly relates to a technique of a method for displaying an operating screen.

In executing, for example, a copy function of an image forming apparatus, the user can arbitrarily change various setting items, such as the copy scale, the copy darkness, and stapling, on the image forming apparatus. Generally, an operating screen including selection keys corresponding to various setting items is displayed on a display integrated with a touch panel. The user performs an operation of changing a setting item which he/she desires to change by pushing down the selection key corresponding to the setting item.

As techniques for increasing the convenience of the operating screen for the user, there are known a method for differentiating the display content of the selection key often used by the user from those of the other selection keys and a technique for changing the manner of displaying (for example, size or color) of each selection key depending upon the frequency of use of the corresponding setting item.

SUMMARY

A technique improved over the aforementioned techniques is proposed as one aspect of the present disclosure.

An electronic apparatus according to an aspect of the present disclosure includes a display, a display control section, a change receiving section, an execution receiving section, a setting change determining section, a change frequency value storage section, a shortcut screen creating section, and a shortcut screen storage section.

The display control section is configured to allow the display to display a normal operating screen including selection keys which correspond to individual setting items for a predetermined function executable on the electronic apparatus and are each configured to receive a command to change the individual setting item.

The change receiving section is configured to receive a change of the individual setting item for the function.

The execution receiving section is configured to receive a command to execute the function.

The setting change determining section is configured to, after the execution receiving section receives the command to execute the function, determine whether or not a content of any of the setting items has been changed.

The change frequency value storage section is configured to store a change frequency value indicating a frequency of change of the individual setting item.

The shortcut screen creating section is configured to create one or more shortcut keys each for receiving a command to change one of the setting items in different sizes depending upon the change frequency value stored in the change frequency value storage section and create a shortcut screen on which the shortcut keys are arranged.

The shortcut screen storage section is configured to store the shortcut screen.

With the shortcut screen stored in the shortcut screen storage section, the display control section reads the shortcut screen from the shortcut screen storage section and allows the display to display the read shortcut screen.

An image forming apparatus according to another aspect of the present disclosure includes the above electronic apparatus and an image forming section configured to form an image on a recording medium.

DETAILED DESCRIPTION

Figure 1:
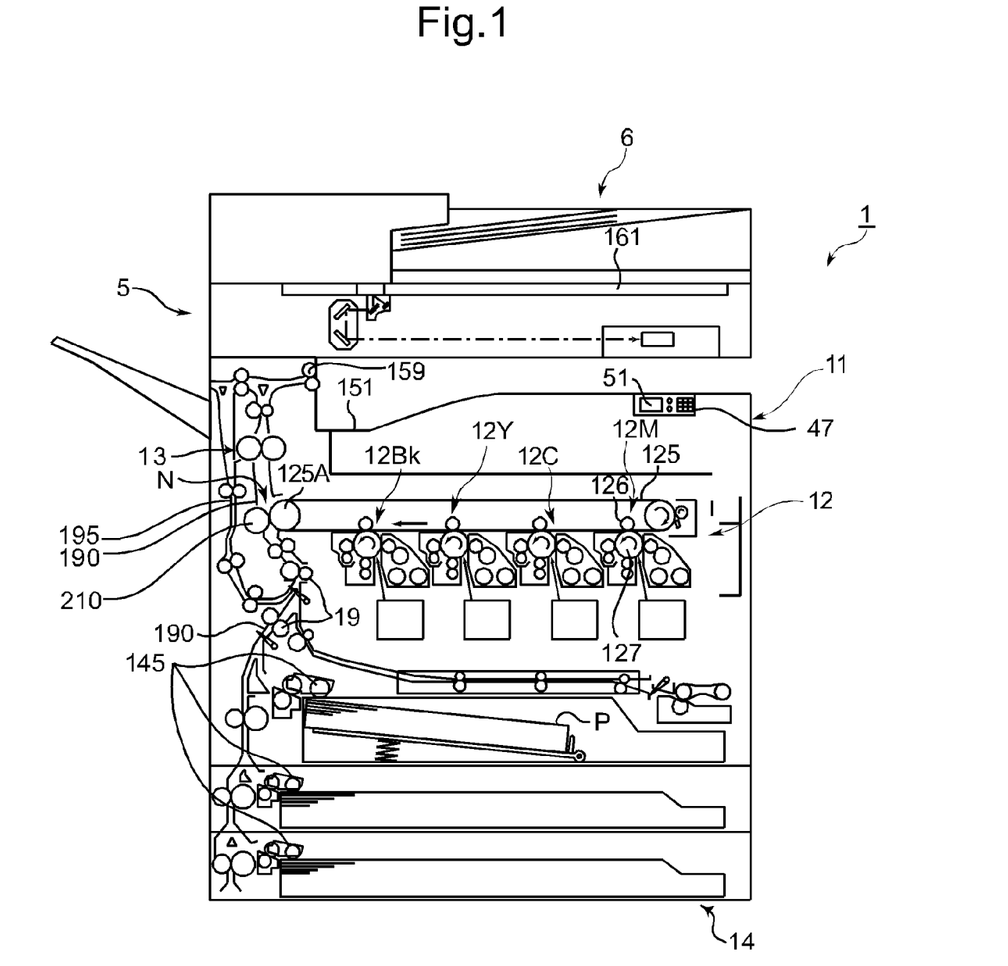
FIG. 1 is a front cross-sectional view showing the structure of an image forming apparatus according to an embodiment of the present disclosure.

Hereinafter, a description will be given of an electronic apparatus and an image forming apparatus according to one embodiment of the present disclosure with reference to the drawings. FIG. 1 is a front cross-sectional view showing the structure of an image forming apparatus according to the one embodiment of the present disclosure.

The image forming apparatus 1 as an example of the electronic apparatus according to the one embodiment of the present disclosure is a multifunction peripheral having multiple functions including, for example, a copy function, a print function, a scan function, and a facsimile function. The image forming apparatus 1 is made up so that an apparatus body 11 thereof includes an operating section 47, an image forming section 12, a fixing section 13, a paper feed section 14, a document feed section 6, a document reading section 5, and so on.

The operating section 47 is configured to receive operator's commands for various types of operations and processing executable by the image forming apparatus 1, such as a command to execute an image forming operation and a command to execute a document reading operation. The operating section 47 includes a display 51 configured to display operation guidance and the like for the operator.

In a document reading operation of the image forming apparatus 1, the document reading section 5 optically reads an image of an original document being fed from the document feed section 6 or an image of an original document placed on an original glass plate 161 to generate image data. The image data generated by the document reading section 5 is stored on an internal HDD, a network-connected computer or the like.

In an image forming operation of the image forming apparatus 1, the image forming section (printing section) 12 forms a toner image on a recording paper sheet P serving as a recording medium fed from the paper feed section 14, based on image data generated by the document reading operation, image data received from a network-connected computer or image data stored on the internal HDD. In the case of color printing, an image forming unit 12M for magenta, an image forming unit 12C for cyan, an image forming unit 12Y for yellow, and an image forming unit 12Bk for black of the image forming section 12 form respective toner images on their respective photosensitive drums 127 through charging, exposure, and developing processes based on respective images of respective different color components constituting the above image data and then allow their respective primary transfer rollers 126 to transfer the toner images to an intermediate transfer belt 125.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and a drive roller 125A with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P on which a multicolor image has been fixed by the completion of the fixing treatment is discharged to a paper output tray 151.

The paper feed section 14 includes a plurality of paper feed cassettes. A control section 100 (see FIG. 3) rotationally drives a pick-up roller 145 of the paper feed cassette containing recording paper sheets of the size designated by an operator's command and thereby allows the pick-up roller 145 to feed a recording paper sheet P contained in the paper feed cassette toward the nip N.

In the case of double-sided printing of the image forming apparatus 1, the recording paper sheet P having an image already printed on one side by the image forming section 12 is nipped by an output roller pair 159, then moved back and conveyed to a reverse conveyance path 195 by the output roller pair 159, and conveyed again upstream of the nip N and the fixing section 13 in a direction of conveyance of the recording paper sheet P by a conveyance roller pair 19. Thus, an image is formed on the other side of the recording paper sheet P by the image forming section 12.

Figure 2:
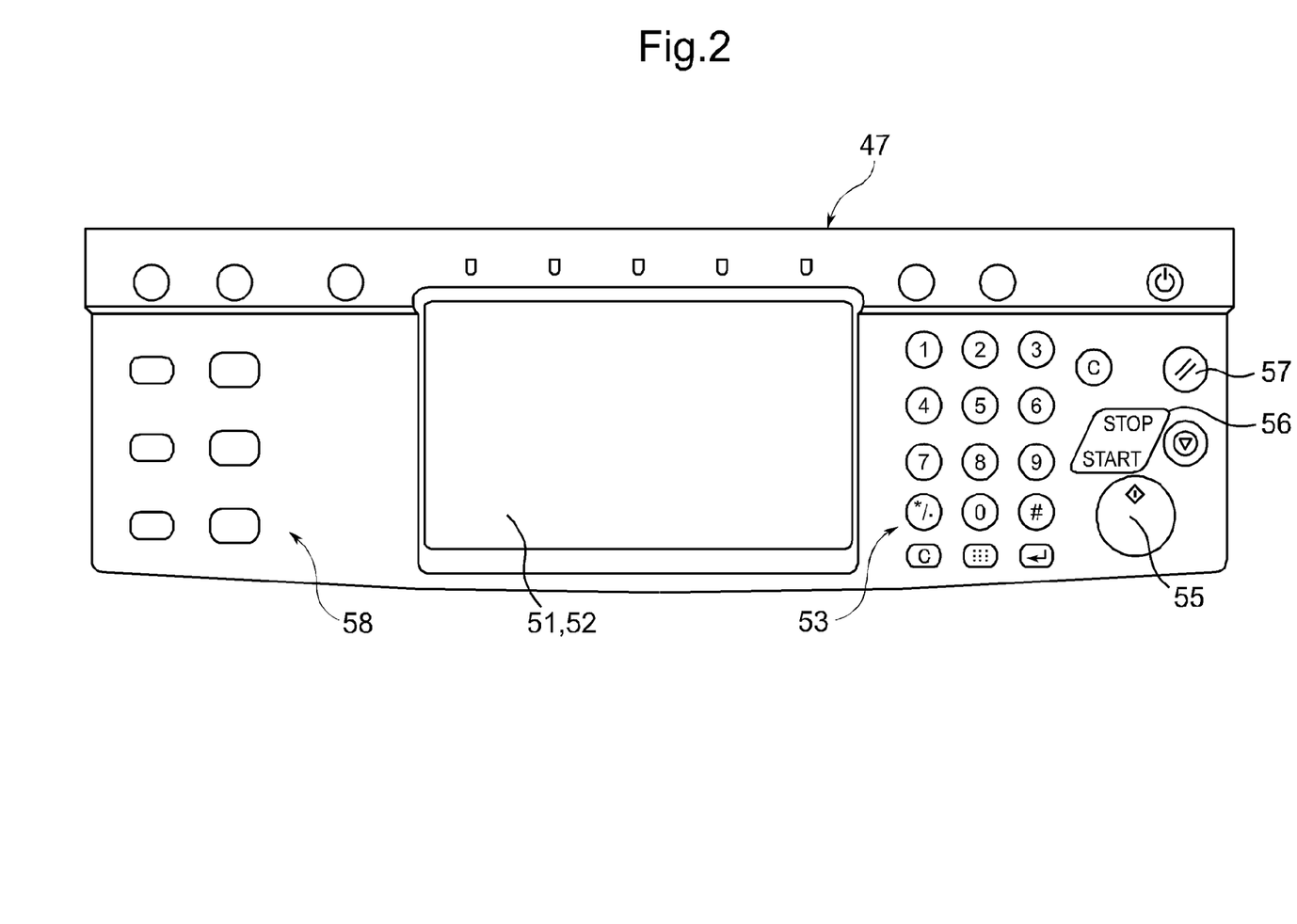
FIG. 2 is a front view of an operating section according to the above embodiment of the present disclosure.

FIG. 2 is an exemplary front view of the operating section 47. The operating section 47 includes the display 51, a touch panel 52 (examples of the change receiving section and the login information receiving section), a numeric keypad 53, various operation buttons 55 to 57, and function selection buttons 58. The display 51 is composed of an LCD (liquid crystal display), an ELD (electronic luminescent display) or the like and configured to display a selection screen, such as for paper size selection, magnification selection, darkness selection, and so on. The display 51 is formed integrally with the touch panel 52. When the user performs a touch operation on the touch panel 52, the touch panel 52 detects the point of touch and outputs a detection signal to the control section 100 to be described later.

The numeric keypad 53 is provided in order that the user can enter, for example, the number of copies during operation of the copy function of the image forming apparatus 1 or a telephone number for destination during operation of the facsimile function thereof. A start button 55 (an example of the execution receiving section) is a button for instructing the start of execution of various functions, such as a copy operation, a print operation, a scan operation, and a facsimile operation. A stop/clear button 56 is a button for stopping the running function or cancelling the entry operation: A reset button 57 is a button for returning the display setting of the display 51 or other various settings to an initial state or a standard operation state. The function selection buttons 58 are buttons for selecting a copy function, a print function, a scan function or a facsimile function.

Figure 3:
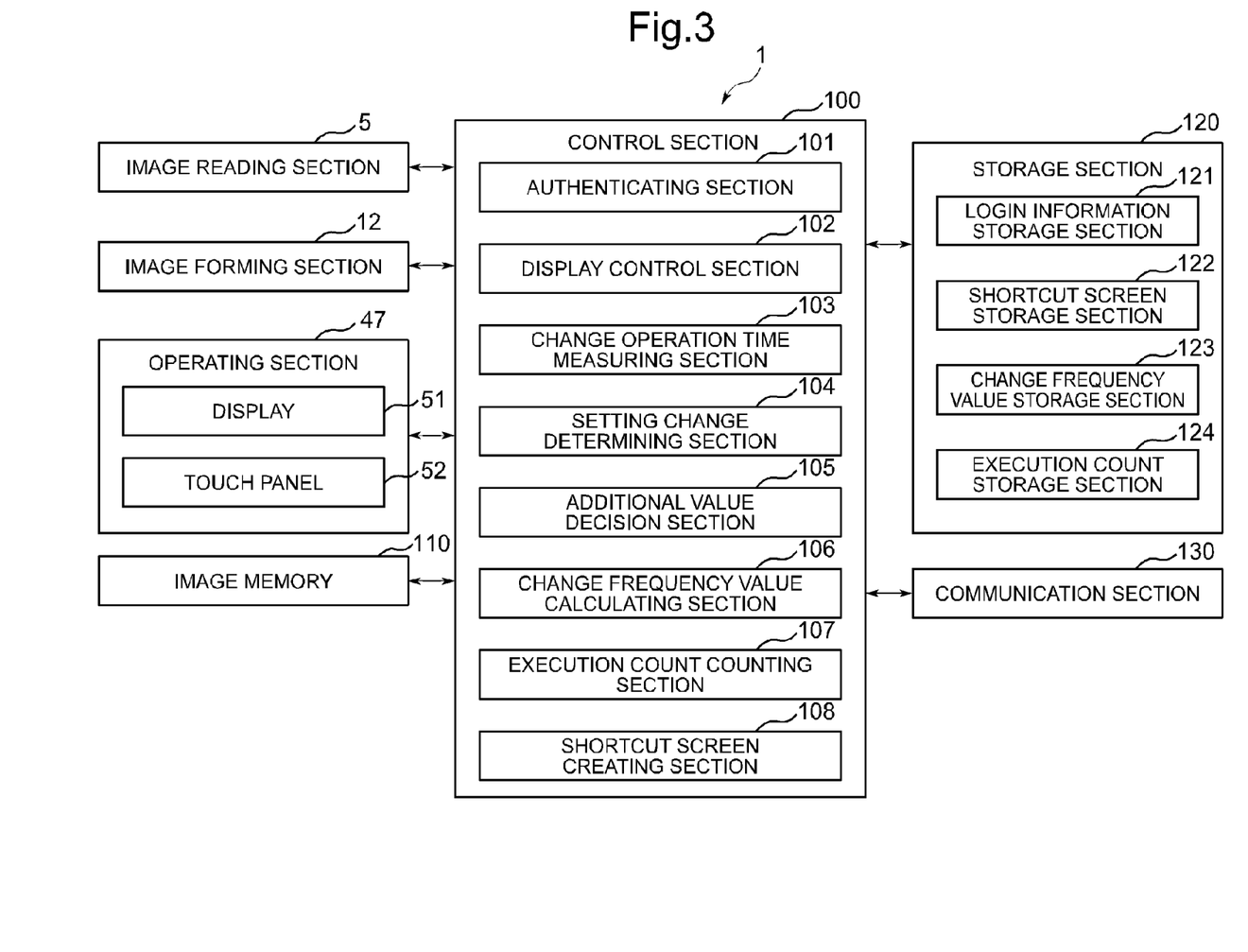
FIG. 3 is a block diagram showing the electric configuration of the image forming apparatus according to the above embodiment of the present disclosure.

FIG. 3 is a block diagram showing the electric configuration of the image forming apparatus 1 according to this embodiment. The image forming apparatus 1 includes a control section 100, an image reading section 5, an image forming section 12, an operating section 47, an image memory 110, a storage section 120, and a communication section 130. Further description of the component elements already described with reference to FIGS. 1 and 2 will be omitted.

The image memory 110 is configured to temporarily store image data acquired by the image reading section 5 or image data received from external devices by the communication section 130.

The storage section 120 is formed of an external storage device or the like and includes a login information storage section 121, a shortcut screen storage section 122, a change frequency value storage section 123, and an execution count storage section 124.

The login information storage section 121 is configured to store, for each user, personal information for login to be entered by the user in using the image forming apparatus 1, such as a login ID and a password. The login information storage section 121 is not necessarily included in the storage section 120 and login information may be stored, for example, on an external server. In such a case, in authentication processing of an authenticating section 101 to be described later, the authenticating section 101 reads, through the communication section 130, personal information stored on the server and executes the processing.

The shortcut screen storage section 122 is configured to store, for each user, a shortcut screen created based on one or more change frequency values. The change frequency value storage section 123 is configured to store, for each user, respective change frequency values of setting items depending upon the respective counts of change of the setting items. The execution count storage section 124 is configured to store, for each user, the respective execution counts of the functions.

The communication section 130 is an interface circuit configured to communicate data with external devices via a LAN (local area network) or a WAN (wide area network) which are connected to the image forming apparatus 1.

The control section 100 is composed of a CPU (central processing unit) or the like and configured to read various programs stored in the storage section 120, perform processing based on the read programs, and take overall control of the image forming apparatus 1 by performing output of command signals to each functional section, data transfer thereto, and so on. The control section 100 includes an authenticating section 101, a display control section 102, a change operation time measuring section 103, a setting change determining section 104, an additional value decision section 105, a change frequency value calculating section 106, an execution count counting section 107, and a shortcut screen creating section 108.

The authenticating section 101 is configured to load a login ID and a password entered through the operating section 47 by a user in using the image forming apparatus 1 and perform authentication processing by checking them against the personal information stored in the login information storage section 121.

The display control section 102 performs a display control to allow the display 51 to display a normal operating screen including selection keys which correspond to individual setting items for the functions and are each configured to receive a user's command to change the individual setting item. The setting items refer to features including, for example, paper size selection, copy darkness adjustment, double- or single-sided printing selection, and reduction/enlargement adjustment. For example, if the setting item is the double- or single-sided printing selection, the content thereof can be selected from among single-sided printing following single-sided reading, double-sided printing following single-sided reading, single-sided printing following double-sided reading, double-sided printing following double-sided reading, single-sided printing following double spread reading, double-sided printing following double spread reading, and so on. If the setting item is the copy darkness adjustment, the content thereof can be set to various darkness levels from low to high. Furthermore, the display control section 102 is configured to allow the display 51 to display an operating screen created by the shortcut screen creating section 108 to be described later.

The change operation time measuring section 103 is configured to, based on timing of a timer, for example, built in the control section 100, measure the time taken for an operation of changing the individual setting item, for example, the time from user's pushdown of the selection key corresponding to the setting item for the relevant function to user's pushdown of the OK key or the start key 55 for the function.

The setting change determining section 104 is configured to, after a command to execute the function has been issued (the pushdown of the start key 55), determine whether or not any of the setting items for the function has been changed.

The additional value decision section 105 is configured to, if the setting change determining section 104 determines that any of the setting items has been changed, decide an additional value to be added to the change frequency value of the changed setting item in accordance with a predetermined condition. The change frequency value calculating section 106 is configured to add the additional value decided by the additional value decision section 105 to the change frequency value of the changed setting item.

The execution count counting section 107 is configured to count the execution count of the individual function. The shortcut screen creating section 108 is configured to, when the execution count counted by the execution count counting section 107 reaches a predetermined number (ten in this embodiment), create a shortcut screen in which the manner of displaying shortcut keys is changed based on the change frequency value.

Figure 4:
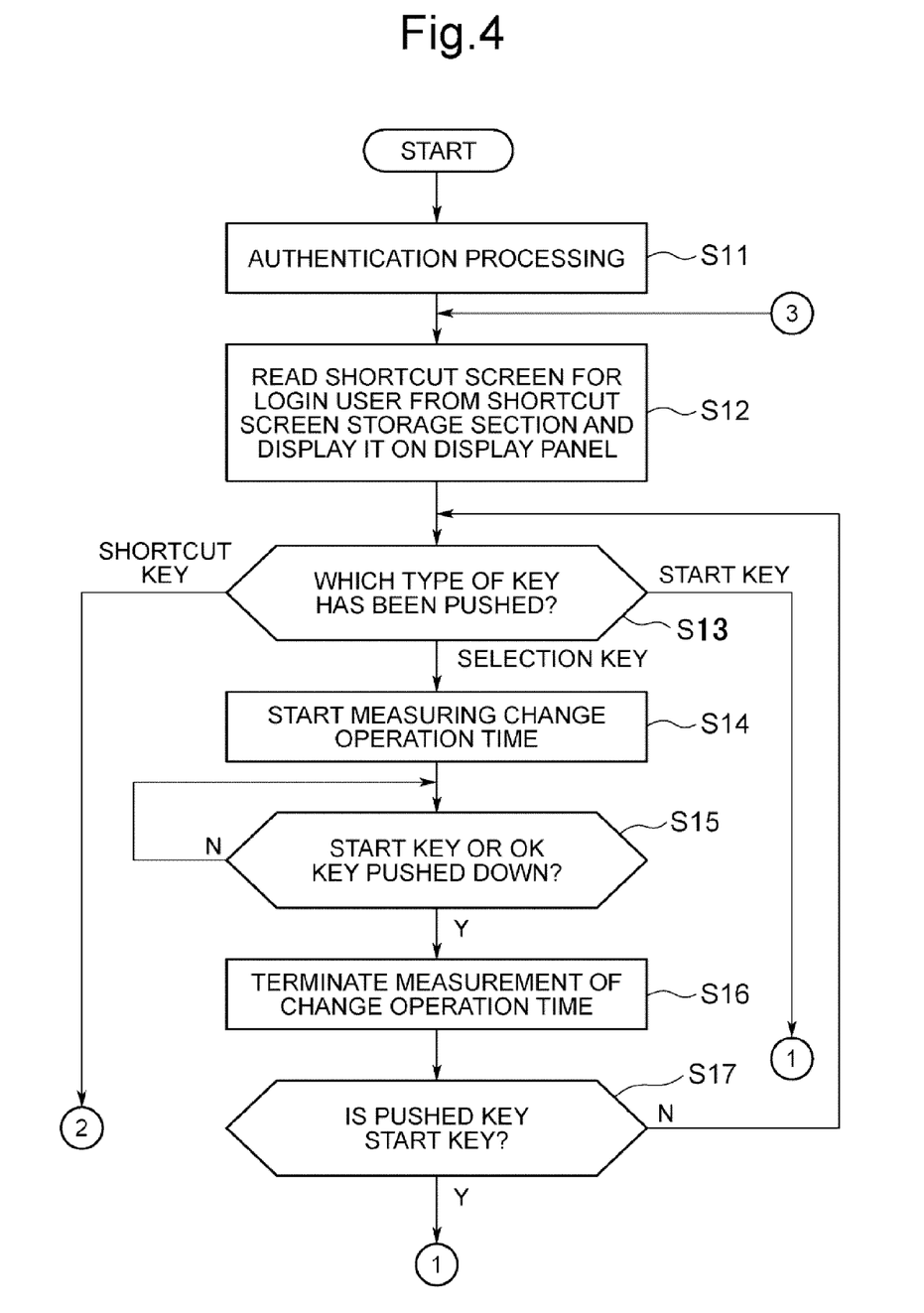
FIG. 4 is a first half of a flowchart for illustrating the flow of shortcut screen creation processing according to the above embodiment of the present disclosure.
Figure 5:
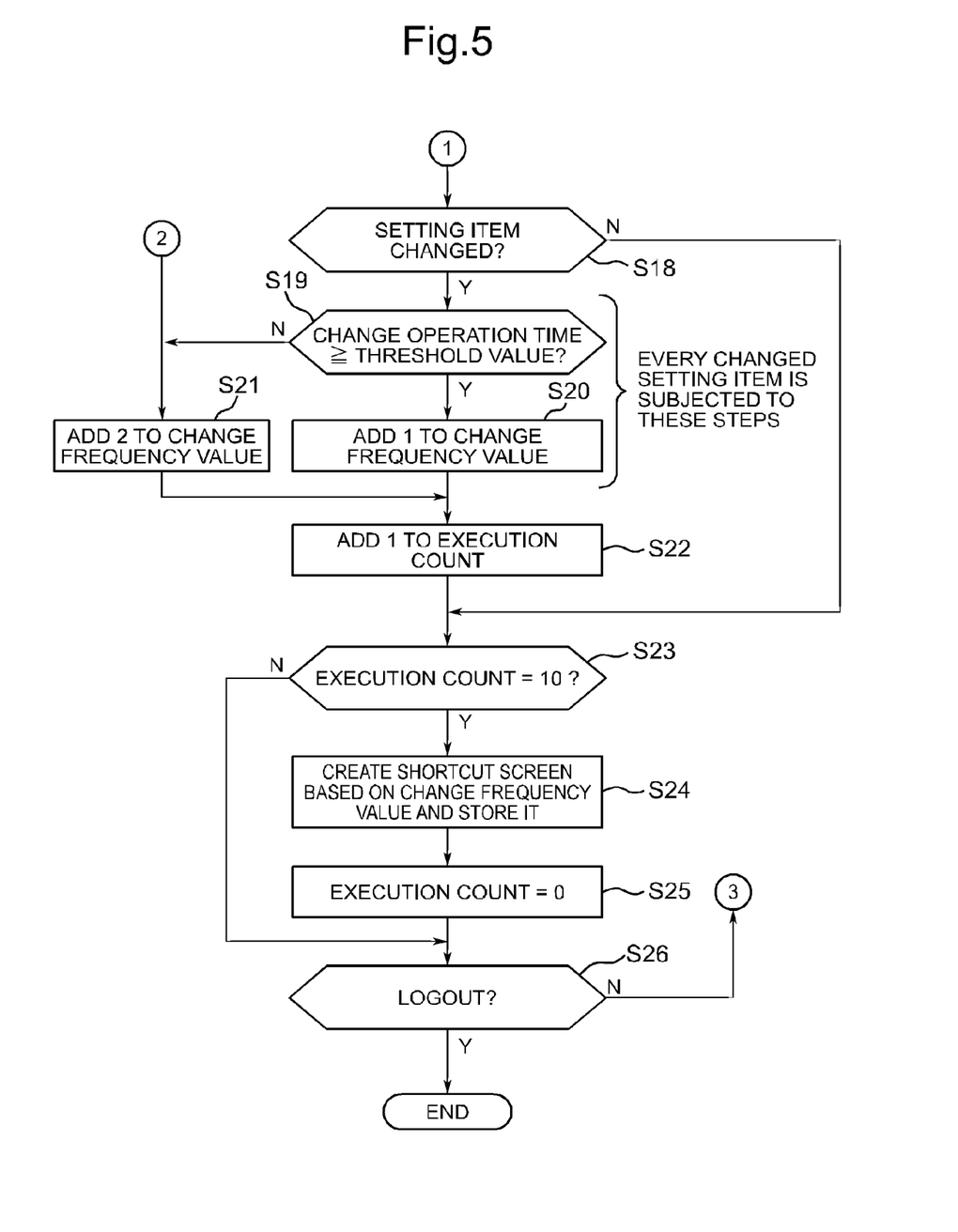
FIG. 5 is a second half of the flowchart for illustrating the flow of shortcut screen creation processing according to the above embodiment of the present disclosure.

Next, a detailed description will be given of shortcut screen creation processing in this embodiment. FIGS. 4 and 5 show a flowchart for illustrating the flow of the shortcut screen creation processing. The following description in this embodiment is given of the case where, among the functions (a copy function, a print function, a scan function, and a facsimile function) of the image forming apparatus 1, the user uses the copy function.

At the start of use of the image forming apparatus 1, the display control section 102 allows the display 51 to display an entry screen for entering login information, such as a user ID and a password. When the user enters login information by operating the operating section 47, the authenticating section 101 performs authentication processing by checking the entered login information against personal information stored in the login information storage section 121 (S11).

If the authenticating section 101 permits the login of the user based on the match of the login information with the personal information as a result of the checking, the display control section 102 reads the shortcut screen for the user logging in (the login user) from the shortcut screen storage section 123 and allows the display 51 to display the shortcut screen (S12).

For a user logging in to the image forming apparatus 1 for the first time or a user having less frequently logged in thereto (having logged in less than ten times in this embodiment), the shortcut screen creating section 108 has not yet created a shortcut screen for the user, or the shortcut screen storage section 122 stores no shortcut screen for the user (details of which will be described later). In this case, in S12, the display control section 102 allows the display 51 to display a predetermined normal operating screen 71.

Figure 6:
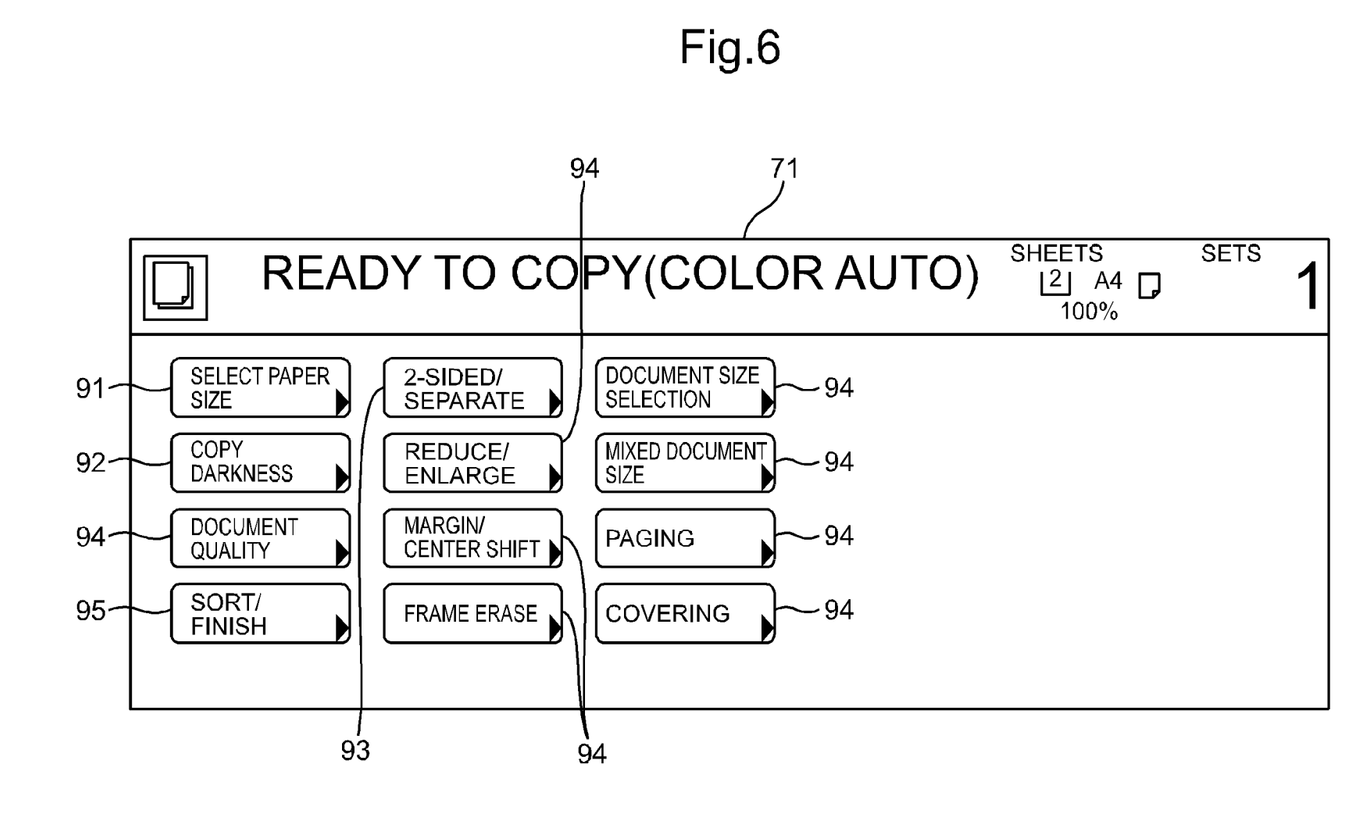
FIG. 6 is a view showing an example of a normal operating screen according to the above embodiment of the present disclosure.

FIG. 6 is a view showing an example of the normal operating screen 17. The normal operating screen 71 includes selection keys 91 to 95 corresponding to the individual setting items each associated with any one of the functions. For example, if the user desires to change the paper sheet size by selecting one of the paper feed cassettes of the paper feed section 14 (i.e., if the setting item is "Select Paper Size"), the user makes a selection by pushing down the selection key 91 displayed on the normal operating screen 71, so that the selection is received through the touch panel function of the touch panel 52. Based on this selection, the display control section 102 allows the display 51 to display an operating screen for selecting the paper size.

If the user desires to change the copy darkness (i.e., if the setting item is "Copy Darkness"), the user selects the selection key 92. Thus, the display control section 102 allows the display 51 to display an operating screen for changing the copy darkness. If the user desires to execute double-sided copying (i.e., if the setting item is "2-sided/Separate"), the user selects the selection key 93. Thus, the display control section 102 allows the display 51 to display an operating screen for selecting double-sided or single-sided copying (an operating screen 72 shown in FIG. 7).

Referring back to FIG. 4, after the display control section 102 reads the operating screen for the login user from the shortcut screen storage section 123 and allows the display 51 to display it or after the display control section 102 allows the display 51 to display the normal operating screen 71, the control section 100 determines which type of key has been subsequently pushed down (S13). If any one of the selection keys 91 to 95 has been pushed down (Selection Key in S13), the change operation time measuring section 103 starts to measure the change operation time (S14). For example, if the user desires double-sided copying, the user pushes down the selection key 93 on the normal operating screen 71. In this case, if the control section 100 determines that the pushed key is a selection key (Selection Key in S13), the change operation time measuring section 103 starts the measurement (S14). Thereafter, the display control section 102 allows the display 51 to display the operating screen 72 shown in FIG. 7. Thus, the image forming apparatus 1 is ready to receive from the user a concrete content of the setting item selected by the user.

Figure 7:
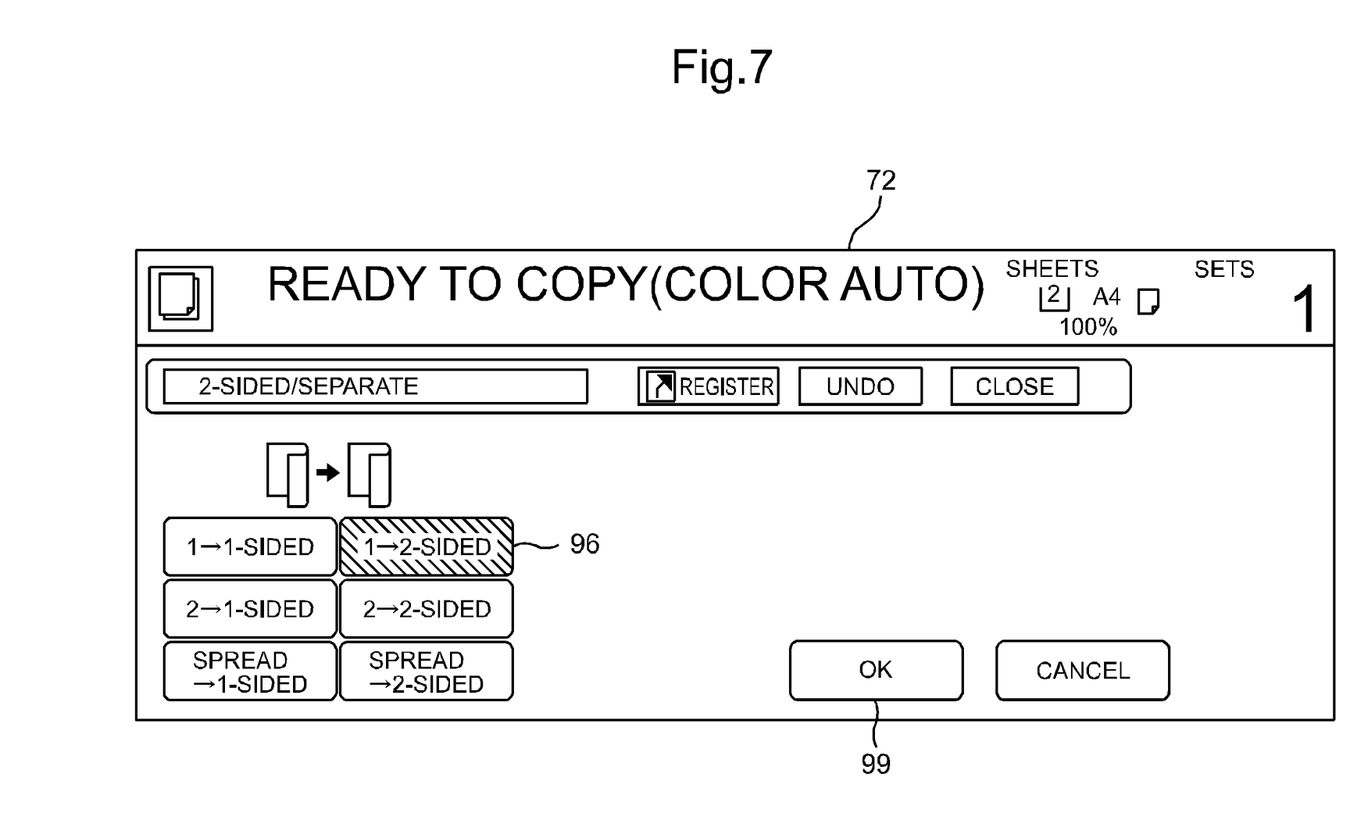
FIG. 7 is a view showing an example of an operating screen according to the above embodiment of the present disclosure.

Taking as an example the case where the setting item is "2-sided/Separate", during display of the above operating screen 72, the user selects a setting key 96 for executing single-sided reading and then double-sided copying. When the user subsequently pushes down an OK key 99 (YES in S15) to enter a user's command to confirm the content of the setting item to be double-sided printing following single-sided reading, the change operation time measuring section 103 terminates the measurement of the change operation time (S16). Then, the change operation time measuring section 103 associates the measured change operation time with the setting item ("2-sided/Separate" in this case) and allows an working memory (not shown) or the like included in the control section 100 to store the associated change operation time.

Also when the user selects the setting key 96 and then pushes down not the OK key 99 but the start key 55, so that a command to execute a copy operation is entered with the confirmation of the content set by the user, the change operation time measuring section 103 likewise terminates the measurement of the change operation time. In this case, concurrently with the pushdown of the start key 55, the control section 100 allows operating mechanisms, including the image forming section 12, to perform the copy operation.

If in S13 the control section 100 determines that the user has pushed down the start key 55 (Start Key in S13), the control section 100 advances the processing to S18.

During transition from displaying one operating screen to displaying another or during stop of the operating screen because of the control section 100 in process, the change operation time measuring section 103 preferably disrupts the measurement of the change operation time.

After S16, the control section 100 determines whether or not the key having been most recently pushed down is the start key 55 (S17). If the most recently pushed key is not the start key 55 but the OK key 99 (NO in S17), the user may further change the contents of the other setting items. Therefore, the processing returns to S13.

On the other hand, if the control section 100 determines that the user has pushed down the start key 55 (YES in S17 or Start Key in S13), the setting change determining section 104 determines whether or not the content of any of the setting items has been changed (S18). Specifically, the setting change determining section 104 stores, for each setting item, a previous value indicating the content of the setting item at the time of entry of a previous command to execute any function (or, at the initial start-up of the image forming apparatus 1 when any command to execute a function has not yet been entered, a default value) and compares the previous value of each setting item with the current value indicating the content of the setting item at the time of pushdown of the start key 55 in S17 or S13. If there is a setting item the previous and current values of which are matched, the setting change determining section 104 determines that the setting item has not been changed. If the two values are different, the setting change determining section 104 determines that the setting item has been changed.

Generally, in electronic apparatuses and image forming apparatuses, a change of a setting item is recorded at the time of the change of the setting item and the count of change thereof is also counted at that time. If the change was a mistake, the user may change the changed content of the setting item back to the previous setting. In conventional techniques, however, the count of change for correcting the mistake is also counted in the total change count. Therefore, the correct change count cannot be calculated. Contrastingly in this embodiment, after the pushdown of the start key 55, i.e., after a command to execute the function has been issued, the setting change determining section 104 determines whether or not any of the setting items has been changed. Thus, the count of change for correcting a mistake is not reflected in the change frequency value, which enables an accurate determination of whether or not each setting item has been changed.

If the setting change determining section 104 determines that any setting item has not been changed (NO in S18), the control section 100 advances the processing to S23. On the other hand, if the setting change determining section 104 determines that any of the setting items has been changed (YES in S18), the additional value decision section 105 decides an additional value to be added to the change frequency value of the changed setting item.

The term "change frequency value" used herein refers to a value indicating the frequency of change of the individual setting item. The change frequency value storage section 124 stores, for each user, the respective change frequency values of the setting items.

The term "additional value" refers to a number to be added to the change frequency value of the individual setting item when the setting item has been changed. The additional value decision section 105 decides the additional value based on the change operation time and the change frequency value calculating section 106 adds the decided additional value to the change frequency value.

The additional value decision section 105 and the change frequency value calculating section 106 perform the processing steps from S19 to S21 for every setting item changed before the execution of the function (i.e., before the pushdown of the start key 55).

A description will be given of a method for deciding the additional value. For example, a short change operation time for a setting item means that the user is used to the operation of changing the setting item and it takes little time for the operation. In other words, it can be considered that the user frequently executes the operation of changing the setting item and the frequency of change of the setting item is high. Therefore, if the additional value decision section 105 determines that the change operation time is not longer than a predetermined threshold value (NO in S19), it decides the additional value to be 2. Then, the change frequency value calculating section 106 reads the change frequency value of the changed setting item from the change frequency value storage section 124 and adds 2 to the read change frequency value (S21).

On the contrary, a long change operation time for a setting item means that the user is unused to the operation of changing the setting item and it takes long time for the operation. In other words, this indicates that the user has little or no experience in executing the operation of changing the setting item and the frequency of change of the setting item is low. Therefore, if the additional value decision section 105 determines that the change operation time is longer than the threshold value (YES in S19), it decides the additional value to be 1. Then, the change frequency value calculating section 106 adds 1 to the read change frequency value (S20).

The term "threshold value" refers to a predetermined operation time, for example, as the shortest time taken for the operation of changing the individual setting item, and a value previously measured at the time of design of the image forming apparatus 1. The additional value decision section 105 previously stores respective threshold values for the setting items in an internal memory (not shown) and is configured to read the relevant threshold value from the internal memory and compare the threshold value with the change operation time for the setting item.

Although in this embodiment the additional value decision section 105 has been described to compare the threshold value with the change operation time, the additional value decision section 105 may calculate the average value of the change operation time for each setting item and compare the average value with the threshold value. In this case, the storage section 120 stores, for each user, the respective histories of the change operation times for the setting items and the additional value decision section 105 reads the measured values of the relevant change operation time from the storage section 120, calculates the average value thereof, and compares the average value with the threshold value. In doing so, the additional value decision section 105 may exclude measured change operation times a predetermined value longer than the average value (for example, change operation times more than twice as long as the average value) from the calculation of the average value. The reason for this is, for example, that change operation times more than twice as long as the average value may indicate that, in the middle of changing the setting item, the user moved away from the image forming apparatus 1 or some trouble occurred, which impedes an accurate calculation of the average value.

More specifically, for example, in the case where the user not only has selected double-sided copying but also has changed the copy darkness, the change operation time measuring section 103 has already measured the change operation time for the setting item "2-sided/Separate" and the change operation time for the setting item "Copy Darkness" before the pushdown of the start key 55. After the pushdown of the start key 55, the additional value decision section 105 reads the change operation time for the setting item "2-sided/Separate", compares the change operation time with the threshold value, and decides the additional value. Furthermore, the change frequency value calculating section 106 reads the change frequency value of the setting item "2-sided/Separate" for the login user from the change frequency value storage section 124 and adds the decided additional value to the read change frequency value.

Subsequently, the additional value decision section 105 reads the change operation time for the setting item "Copy Darkness", compares the change operation time with the threshold value, and decides the additional value. Furthermore, the change frequency value calculating section 106 reads the change frequency value of the setting item "Copy Darkness" for the login user from the change frequency value storage section 124 and adds the decided additional value to the read change frequency value.

In this embodiment, a description has been given of, as an example, the case where the additional value decision section 105 decides the additional value depending upon the determination of whether or not the change operation time is longer than the threshold value. However, no particular limitation is placed on the method for deciding the additional value so long as the additional value is decided so that the shorter the change operation time, the greater the additional value and the longer the change operation time, the smaller the additional value.

Next, the execution count counting section 107 reads the execution count value of the executed function from the execution count storage section 124 and adds 1 to the execution count value (S22). Then, the shortcut screen creating section 108 determines whether or not the execution count value after the addition is the predetermined value, 10 (S23). If the execution count value after the addition has been determined to be 10 (YES in S23), the shortcut screen creating section 108 reads the respective change frequency values of the setting items for the login user from the change frequency value storage section 123 and creates a shortcut screen based on the change frequency values and the shortcut screen storage section 122 stores the created shortcut screen (S24).

A detailed description will be given of a method for creating a shortcut screen by the shortcut screen creating section 108. The shortcut screen creating section 108 creates a highly convenient operating screen by changing the manner of displaying the shortcut keys for the setting items based on the change frequency values calculated for previous ten times of execution of functions. Specifically, the shortcut screen creating section 108 reads the respective change frequency values of the setting items for the login user from the change frequency value storage section 123, creates shortcut keys to be quickly displayed as a setting screen for setting items having a high change frequency value, and creates a shortcut screen as the setting screen on which the created shortcut keys are arranged.

Figure 8:
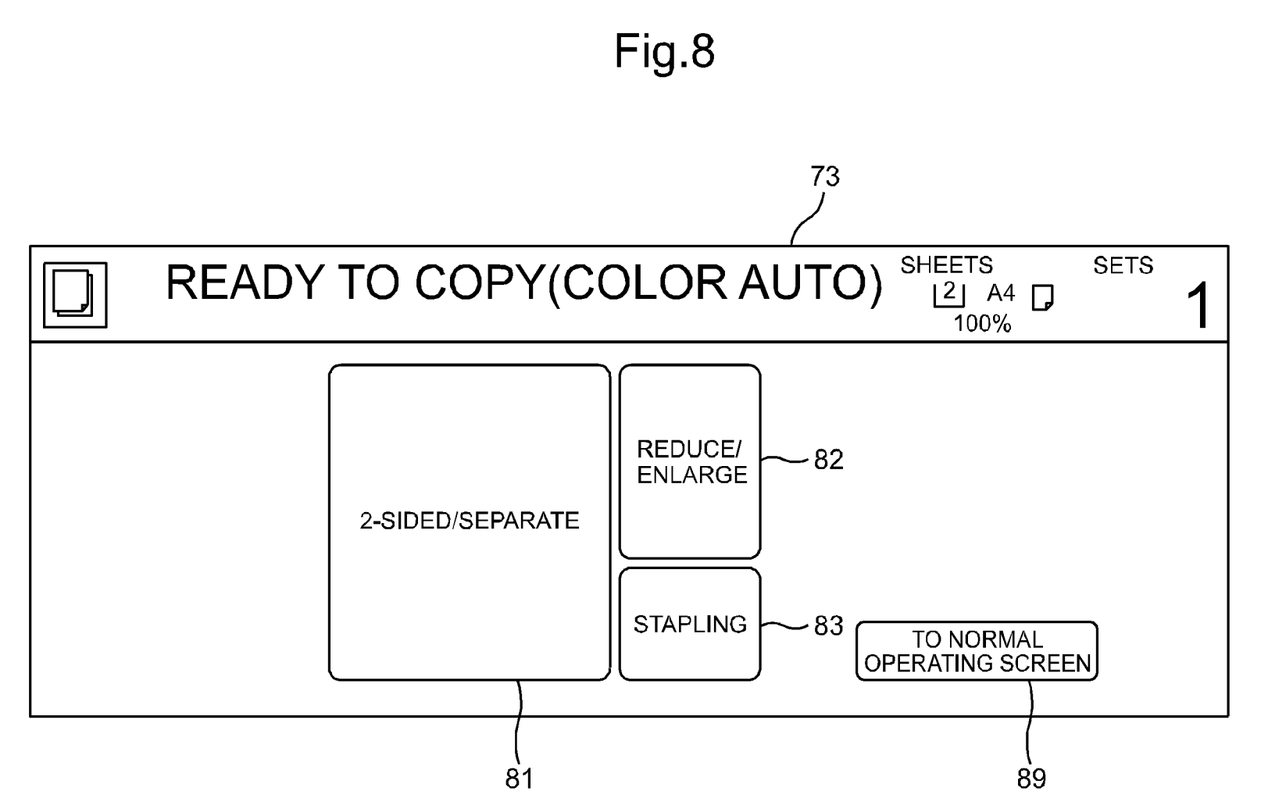
FIG. 8 is a view showing an example of a shortcut screen according to the above embodiment of the present disclosure.

FIG. 8 is a view showing an example of a shortcut screen 73 created by the shortcut screen creating section 108. For example, let's suppose that, in creating three shortcut keys on a shortcut screen, the setting item "2-sided/Separate" has the greatest change frequency value of all the setting items, the setting item "Reduce/Enlarge" has the second greatest change frequency value, and the setting item "Stapling for Finish/Sort" has the third greatest change frequency value. In this case, the shortcut screen creating section 108 creates a shortcut key 81 for the setting item "2-sided/Separate" in a greater size than the other shortcut keys and places it on the center of the shortcut screen serving as an operating screen.

Note that a key 89 on the shortcut screen 73 is a key for return to the normal operating screen 71. When the user pushes down the key 89, the display control section 102 receives the user's command through the touch panel 52 and allows the display 51 to display the normal operating screen 71.

Next, the shortcut screen creating section 108 creates a shortcut key 82 for the setting item "Reduce/Enlarge" in a smaller size than the shortcut key 81 and places it adjacent to the shortcut key 81. Furthermore, the shortcut screen creating section 108 creates a shortcut key 83 for the setting item "Stapling" in a still smaller size than the shortcut key 82 and places it adjacent to the shortcut key 81. In this manner, the shortcut screen creating section 108 decides the size of each shortcut key in proportion to the magnitude of the change frequency value and places shortcut keys of greater change frequency value closer to the center of the operating screen to create a shortcut screen.

Although in this embodiment the shortcut screen creating section 108 is configured to create a shortcut key for a setting item having a greater change frequency value in a greater size and place it closer to the center of the operating screen, shortcut keys of different change frequency values may additionally be differentiated from each other in color or other features. In other words, the shortcut screen creating section 108 creates shortcut keys so that a shortcut key for a setting item having a higher frequency of use is more visible.

Furthermore, only by the presence of a setting item of which the change frequency value stored in the change frequency value storage section 123 is not smaller than a predetermined value, the shortcut screen creating section 108 may create a shortcut key for receiving a command to change the setting item and create a shortcut screen on which the shortcut key is placed. For example, the shortcut screen creating section 108 may create a shortcut screen only if the greatest of change frequency values of setting items read from the change frequency value storage section 123 is not smaller than a predetermined value, whereas it may not create a shortcut screen if the greatest change frequency value is smaller than the predetermined value. Unless the shortcut screen creating section 108 creates a shortcut screen or unless the shortcut screen storage section 122 stores a shortcut screen, the display control section 102, upon login, allows the display 51 to display the normal operating screen 71 shown in FIG. 6.

Referring back to FIG. 5, after S24, the execution count counting section 107 resets the execution count to 0 (S25). On the other hand, if the execution count is not 10 (NO in S23), the control section 100 advances the processing to S26. Next, if the user has not yet logged out (NO in S26), the control section 100 returns the processing to S12. On the other hand, if the user has already logged out (YES in S26), the control section 100 terminates the processing.

If in S13 any shortcut key (any one of the shortcut keys 81, 82, and 83) on the shortcut screen has been pushed down (Shortcut Key in S13), the change operation time measuring section 103 does not measure the change operation time, the additional value decision section 105 sets the additional value to 2, and the change frequency value calculating section 106 reads the change frequency value associated with the pushed shortcut key from the change frequency value storage section 123 and adds 2 to the read change frequency value (S21).

The pushdown of a selection key on the shortcut screen 73 means that the setting item corresponding to the selection key is frequently used. Therefore, the change operation time measuring section 103 does not measure the change operation time for the setting item and the additional value decision section 105 decides the additional value to be 2. Thus, the processing load on the measurement of the change operation time can be reduced.

As thus far described, since shortcut keys to be quickly displayed as a setting screen for setting items having a relatively high change frequency value are created in a highly visible manner for the user and are placed on a shortcut screen, the convenience for the user can be increased. Furthermore, the shortcut screen created by the shortcut screen creating section 108 is stored in the shortcut screen storage section 122 and the display control section 102, upon user's login, reads the shortcut screen stored in association with the login user and allows the display 51 to display the shortcut screen. Therefore, the user can quickly change the setting item having a high frequency of use, resulting in increased working efficiency.

In addition, instead of simply counting the count of change of the individual setting item, the change operation time measuring section 103 measures the time taken for the operation of changing the setting item (i.e., the change operation time) and the value to be added to the change frequency value is variably selected depending upon the measured change operation time. Thus, the change frequency value of the setting item having a high frequency of use can be surely increased, so that the shortcut key for the setting item is highly likely to be placed on the shortcut screen. Therefore, the shortcut key for the setting item having a high frequency of use can be accurately placed on the shortcut screen.

Furthermore, after the pushdown of the start key 55, i.e., after the issuing of a command to execute any function, the setting change determining section 104 determines whether or not any of the setting items has been changed. Therefore, whether or not each setting item has been changed can be accurately determined.

The present disclosure is not limited to the above embodiment and can be modified in various ways. For example, although the description of the above embodiment is given taking the image forming apparatus 1 formed of a multifunction peripheral as an example of the electronic apparatus according to the present disclosure, the example is merely illustrative and the electronic apparatus may be any other image forming apparatus, such as a printer, a copier or a facsimile machine or any other electronic apparatus, such as medical equipment or a display.

The structure and processing shown in the above embodiment with reference to FIGS. 1 to 8 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. An electronic apparatus comprising:
a display;
an operation device, the operation device comprising:
   a change receiving section configured to receive a change of individual setting items for a predetermined function executable on the electronic apparatus; and
   an execution receiving section configured to receive a command to execute the function;
a storage device, the storage device comprising:
   a change frequency value storage section configured to store a change frequency value indicating a frequency of change of the individual setting item;
   a shortcut screen storage section configured to store the shortcut screen; and
a CPU, the CPU comprising:
   a display control section configured to allow the display to display a normal operating screen including selection keys which correspond to the individual setting items for the function and are each configured to receive a command to change the individual setting item;
   a change operation time measuring section configured to measure a change operation time which is a time from a performance of a first operation among a plurality of operations to a performance of a last operation among the plurality of operations, the plurality of operations constituting an operation for which the change receiving section receives the change of the individual setting item;
   an additional value decision section configured to decide a predetermined greater additional value for the setting item if the change operation time for the setting item is not longer than a predetermined threshold value and to decide a predetermined additional value smaller than the greater additional value for the setting item if the change operation time is longer than the predetermined threshold value, and to decide the additional value by using the threshold values different for each of the setting items;

a setting change determining section configured to, after the execution receiving section receives the command to execute the function, determine whether or not a content of any of the setting items has been changed;

a change frequency value calculating section configured to, when the setting change determining section determines that any of the setting items has been changed, add the additional value decided by the additional value decision section to the change frequency value of the changed setting item stored in the change frequency value storage section;

an execution count counting section configured to add an execution count of the function received by the execution receiving section after adding the additional value to the change frequency value; and a shortcut screen creating section creates a shortcut screen and the shortcut screen storage section updates and stores the shortcut screen each time when the execution count reaches a predetermined number, wherein the shortcut screen creating section is configured to create one or more shortcut keys, which are different from the selection keys, each for receiving a command to change one of the setting items corresponding to the selection keys in different sizes depending upon the change frequency value, which is stored in the change frequency value storage section and to which the additional value is added by the change frequency value calculating section, and create a shortcut screen on which the shortcut keys are arranged, and wherein the display control section reads the shortcut screen from the shortcut screen storage section and allows the display to display the read shortcut screen.

2. The electronic apparatus according to claim 1, wherein only by the presence of a setting item of which the change frequency value stored in the change frequency value storage section is not smaller than a predetermined value, the shortcut screen creating section creates a shortcut key for receiving a command to change the setting item and creates a shortcut screen on which the shortcut key is placed.

3. The electronic apparatus according to claim 1, wherein when the change receiving section receives the change of the setting item through the shortcut key, the change operation time measuring section does not measure the change operation time for the setting item and the additional value decision section sets the additional value for the change frequency value of the setting item to be a value increased by a predetermined value.

4. The electronic apparatus according to claim 1, further comprising a change operation time measuring section configured to measure a change operation time which is a time taken for an operation of changing the individual setting item, wherein the additional value decision section calculates, for each of the setting items, an average value of the change operation time measured by the change operation time measuring section and decides the additional value under the predetermined condition that the smaller the calculated average value, the greater the additional value and the greater the average value, the smaller the additional value.

5. The electronic apparatus according to claim 4, wherein if the change operation time measured by the change operation time measuring section is a predetermined value longer than the average value, the additional value decision section excludes the change operation time from the calculation of the average value.

6. The electronic apparatus according to claim 1, further comprising:

an identification information receiving section configured to receive an entry of login information for an individual user;

and an authenticating section configured to perform personal authentication based on the entered login information, wherein the change frequency value storage section is configured to store, for each user authenticated by the authenticating section, the respective change frequency values of the setting items, the change frequency value calculating section is configured to read, out of the respective change frequency values of the setting items stored in association with the user logging in, the change frequency value of the changed setting item from the change frequency value storage section and add the additional value to the change frequency value, the shortcut screen creating section is configured to extract, out of the respective change frequency values of the setting items stored in association with the user logging in, one or more setting items having a great change frequency value from the change frequency value storage section and create the shortcut screen for the extracted setting items, the shortcut screen storage section is configured to store the shortcut screen created by the shortcut screen creating section in association with the user, and the display control section is configured to read the shortcut screen stored in association with the user from the shortcut screen storage section and allows the display to display the read shortcut screen.

7. An image forming apparatus comprising:

an image forming section;

a display;

an operation device, the operation device comprising:

a change receiving section configured to receive a change of individual setting items for a predetermined function executable on the electronic apparatus; and an execution receiving section configured to receive a command to execute the function;

a storage device, the storage device comprising:

a change frequency value storage section configured to store a change frequency value indicating a frequency of change of the individual setting item; and a shortcut screen storage section configured to store the shortcut screen; and a CPU, the CPU comprising:

a display control section configured to allow the display to display a normal operating screen including selection keys which correspond to the individual setting items for the function and are each configured to receive a command to change the individual setting item, the predetermined function at least includes an image forming function, a copy function, and a scan function;

a change operation time measuring section configured to measure a change operation time which is a time from a performance of a first operation among a plurality of operations to a performance of a last operation among the plurality of operations, the plurality of operations constituting an operation for which the change receiving section receives the change of the individual setting item; an additional value decision section configured to decide a predetermined greater additional value for the setting item if the change operation time for the setting item is not longer than a predetermined threshold value and to decide a predetermined additional value smaller than the greater additional value for the setting item if the change operation time is longer than the predetermined threshold value, and to decide the additional value by using the threshold values different for each of the setting items;

a setting change determining section configured to, after the execution receiving section receives the command to execute the function, determine whether or not a content of any of the setting items has been changed; a change frequency value calculating section configured to, when the setting change determining section determines that any of the setting items has been changed, add the additional value decided by the additional value decision section to the change frequency value of the changed setting item stored in the change frequency value storage section;

an execution count counting section configured to add an execution count of the function received by the execution receiving section after adding the additional value to the change frequency value; and a shortcut screen creating section creates a shortcut screen and the shortcut screen storage section updates and stores the shortcut screen each time when the execution count reaches a predetermined number;

wherein the shortcut screen creating section is configured to create one or more shortcut keys, which are different from the selection keys, each for receiving a command to change one of the setting items corresponding to the selection keys in different sizes depending upon the change frequency value, which is stored in the change frequency value storage section and to which the additional value is added by the change frequency value calculating section, and create a shortcut screen on which the shortcut keys are arranged; and wherein the display control section reads the shortcut screen from the shortcut screen storage section and allows the display to display the read shortcut screen.

8. The electronic apparatus according to claim 1, wherein the shortcut screen includes one or more keys for transition to the normal operating screen, when the shortcut screen is stored in the shortcut screen storage section at a start of use of the image forming apparatus, the display control section reads the shortcut screen and allows the display to display the shortcut screen, and when the shortcut screen is not stored in the shortcut screen storage section at the start of use of the image forming apparatus, the display control section allows the display to display the normal operating screen.

* * * * *